United States Patent [19]
Ninose et al.

[11] Patent Number: 6,105,098
[45] Date of Patent: Aug. 15, 2000

[54] METHOD FOR MANAGING SHARED RESOURCES

[75] Inventors: Kenta Ninose; Akira Otsuji, both of Yokohama; Yuzuru Maya, Sagamihara; Hirofumi Nagasuka, Sagamihara; Taketoshi Sakuraba, Sagamihara, all of Japan

[73] Assignee: Hitachi, Ltd., Tokyo, Japan

[21] Appl. No.: 09/139,565

[22] Filed: Aug. 25, 1998

[30] Foreign Application Priority Data

Aug. 26, 1997 [JP] Japan .................................... 9-229127

[51] Int. Cl.[7] ........................... G06F 13/14; G06F 12/00; G06F 9/50
[52] U.S. Cl. .......................... 710/200; 710/36; 709/104; 711/147
[58] Field of Search ............................... 710/200, 18, 36, 710/108, 52; 707/8, 9; 709/104, 100, 107, 229, 300, 215; 711/151, 152, 163, 147

[56] References Cited

U.S. PATENT DOCUMENTS

| | | |
|---|---|---|
| 5,140,685 | 8/1992 | Sipple et al. . |
| 5,317,739 | 5/1994 | Elko et al. . |
| 5,392,433 | 2/1995 | Hammersley et al. . |
| 5,423,044 | 6/1995 | Sutton et al. . |
| 5,561,809 | 10/1996 | Elko et al. . |
| 5,832,484 | 11/1998 | Sankaran et al. . |
| 5,842,015 | 11/1998 | Cunniff et al. . |

OTHER PUBLICATIONS

"Modern Operating Systems", Andrew S. Tanenbaum, pp. 38–39.

IBM Systems Journal, vol. 36, No. 2, 1997, "A locking facility for parallel systems", N. S. Bowen, pp. 202–220.

*Primary Examiner*—Gopal C. Ray
*Attorney, Agent, or Firm*—Mattingly, Stanger & Malur

[57] ABSTRACT

An enqueue structure type is provided within a coupling facility to record the use state and to manage a request queue of resources shared among programs on computers of a system. All programs to use a shared resource issue a request to reserve the shared resource to the coupling facility before using it. The coupling facility affords the permission to use the resource to the programs if it is usable, and adds the programs to the resource request queue if unusable. When a program using the shared resource frees it, the coupling facility fetches a program from the beginning of the request queue, reserves the shared resource for the next program and notifies the next program that the use of the shared resource has been approved. On receiving the notification, the program uses the shared resource without asking the coupling facility for the approval of the use of the shared resource again. Further, exclusive control of shared resources by use of a spin lock having shared and exclusive attributes is implemented by using two locks for one shared resource, wherein the first lock is reserved and then freed after the second lock is reserved.

20 Claims, 13 Drawing Sheets

METHOD FOR MANAGING SHARED RESOURCES

FIELD OF THE INVENTION

The present invention relates to a method for managing shared resources and more particularly to a method for managing resources shared by a plurality of computers and programs.

BACKGROUND OF THE INVENTION

The techniques disclosed in Japanese Unexamined Patent Publication (Kokai) Nos. 6-4490 "Data Processing System" (hereinafter JP 6-4490) and 6-44195 "Method and Apparatus for a Coupling Type Data Processing System" (hereinafter Jp 6-44195) provide methods for managing resources shared among computers (central processing complex (CPC)) in a general purpose parallel computer system using a coupling facility (structured external storage (SES) facility).

According to JP 6-44195, computers, each being connected to the coupling facility by an intersystem channel, manage shared resources by using shared data objects (two kinds of objects called cache structures and list structures are described) called structures or structure types held in the coupling facility, and processing routines called message manipulation for manipulating objects contained in the structures and structure types. The message manipulation is often called message commands or simply commands. The coupling facility can hold a plurality of structure types which are identified by identifiers called structure identifiers (SID).

A scheme for computers to perform message manipulation using the coupling facility is disclosed in JP 6-4490. According to the scheme, computers start the message manipulation by sending, to the coupling facility, a memory block of a predetermined size called a message command block (MCB) prepared in a memory using an instruction called a message send instruction (SMSG instruction).

According to JP 6-44195, a plurality of commands for manipulating structure types according to their kind are defined in advance in the coupling facility, and the computers start message manipulation by sending an MCB in which commands are specified, to the coupling facility via an intersystem channel by using an SMSG instruction. The started message manipulation sets execution results in a memory block of a predetermined size called a message response block (MRB), and terminates the message manipulation by sending back the MRB to the computer which sent the commands. The MCB can contain an SID to specify a structure type which is subject to the message manipulation to be started.

Of the two kinds of structure types described in JP 6-44195, a list structure type can contain a lock table consisting of several lock table items. Several lock-only commands for manipulating a lock table are defined in the lock table. The structure of the lock table and the lock-only commands are disclosed in JP 6-44195.

The following brief discussion relates to a method for managing resources shared among computers by using the techniques described in JP 6-4490 and JP 6-44195 in a general purpose parallel computer system which employs the coupling facility.

By using a proper lock-only command, one lock table item can be updated only when conditions are satisfied, and whether the updating succeeded or failed can be determined from an MRB of the command. Detailed conditions in which the updating of a lock table by lock-only commands succeeds or fails are described in JP 6-44195. The commands allow lock table items to be used to indicate the status of shared resources. Generally, objects used to indicate the status of shared resources such as table items are called "locks".

A computer program which uses shared resources predetermine a value indicating that shared resources are being used. The program also predetermines a value indicating that shared resources are not used by any program (called free state).

When a program starts to use a shared resource, a lock-only command is used to write to a lock table item a value that the shared resource is being used, only when a lock table item corresponding to the shared resource indicates the free state of the shared resource. Sending such a command to the coupling facility is called a "lock reservation request". If the updating of a lock table item by the command, that is, lock reservation succeeds, the shared resource can be used by the program that sent the lock-only command, and the program can start processing using the shared resource.

When lock reservation fails (when the updating of a lock table item by a lock-only command described previously fails), it indicates that the shared resource is being used by another program. In this case, a program which attempts to start the use of the shared resource waits for the lock to be freed (eventually the resource is freed) by another program, by repeatedly sending the same command to the coupling facility until lock reservation succeeds.

The program which terminates the use of the shared resource sends a lock-only command to write a value indicating the free state of the shared resource to a corresponding lock table item. Sending such a command to the coupling facility is called "freeing a lock". When a program keeping the lock frees the shared resource, the program waiting for the lock to be freed which repeatedly issued the lock reservation request, succeeds, and starts processing using the shared resource.

Thus, a method for managing resources shared among computers can be provided.

When a process requires access to a shared resource, the shared resource is exclusively controlled for management among a plurality of processes in such a way that the process loops wait until the shared resource becomes available to them. This is generally called a spin type exclusive control, which is the base of exclusive control in a computer system in which a plurality of processes operate in parallel. Exclusive control processing used therein is called spin locking. Here, a process refers to all processing performed in a computer system.

Spin locking is implemented by the known method of using a TEST AND SET LOCK instruction (TSL instruction) described on Pages 38 and 39 in "Modern Operating Systems (by Andrew S. Tanenbaum) or similar instructions, for example. This method is primarily used to implement spin locking among instruction processing units in a computer having a tightly coupled multiprocessor configuration in which a plurality of instruction processing units share one main storage. In this case, a process is an instruction processing unit.

By using the lock table and lock-only commands of the coupling facility described in JP 6-44195, spin locking can be implemented among programs on computers in a general purpose parallel computer system using the coupling facility. In this case, a process is a program on a computer.

In the spin locking, a process using a shared resource waits until a lock corresponding to the shared resource can be reserved, then performs processing using the shared resource, and at termination of the processing, frees the lock to notify other processes of the fact.

The "lock" in spin locking refers to the (one) word in memory when the spin locking is implemented using a TSL instruction described previously, and the (one) lock table item when implemented using a lock table and lock-only commands. By associating these locks with shared resources, the reservation of shared resources is replaced by the reservation of locks.

A value can be set in a lock to indicate whether a shared resource is being used by processes or is not being used by any process (in a free state). The value is predetermined.

A request to reserve a lock in the spin locking is an attempt for a process to set in the lock the value indicating that it is using a shared resource. However, only when a value indicating the free state of a resource is set in the lock, the lock can be updated to a value indicating that the resource is being used, and it is therefore necessary to perform in combination the checking for a free state and the setting of a use indication. The TSL instruction and lock-only commands described previously ensure that the checking of an old value and the setting of a new value are performed in combination. Successful setting of a use indication in a lock is referred to as a "process reserving a lock".

When the setting of a value in a lock fails, a process repeats the same operation until it succeeds. This repetition is called "lock wait spin". Thus, waiting by simple loop processing for a lock to be reserved is the characteristic being in lock wait spin.

"Freeing a lock" means the setting, in a lock, of a value indicating that a shared resource is not being used. In this way, since a lock reservation request made repeatedly by a process waiting for the lock to be freed succeeds, a program having reserved the lock can start processing using the shared resource.

FIG. 12 is an example of a resource management table used when resources are exclusively controlled using the spin locking. A resource management table 1200 has lines 1210-1 to 1210-j, which are associated with resources 1220-i to 1220-j, respectively, by resource pointer 1240. Each line 1210 contains a lock 1230. When accessing a shared resource 1220, a process issues a request to reserve a lock 1230 corresponding to it, and reserves the lock 1230 before accessing a shared resource 1220.

The reservation of the lock 1230 falls into two attributes, depending on the type of access to the shared resource 1220: shared and exclusive. The reservation of the lock 1230 with an exclusive attribute is to permit only one process to reserve the lock 1230. A request to reserve the lock 1230 with an exclusive attribute is accepted only when no other process reserves the lock 1230. On the other hand, the reservation of the lock 1230 with a shared attribute is to permit a plurality of processes to reserve the lock 1230 if all of them attempt to reserve the lock with a shared attribute. A request to reserve the lock 1230 with a shared attribute is accepted unless other processes exclusively reserve the lock 1230.

To be brief, processes that only read the shared resource 1220 without modifying it reserve the lock 1230 corresponding to the resource with a shared attribute, and processes that modify the resource reserve the lock 1230 corresponding to the resource with an exclusive attribute. Thus, processes that perform only reading can access the shared resource 1220 at the same time.

FIG. 13 is a flowchart showing resource exclusive processing using the spin locking. It is a flowchart showing lock reservation states when processes A, B, and C request one shared resource 1220 with shared, exclusive, and shared attributes in that order.

To gain shared access to the shared resource 1220, process A first issues a request to reserve a corresponding lock 1230 with a shared attribute (step 1300). Since the lock 1230 is not reserved by any process at this point, it is immediately reserved by the process A with a shared attribute (step 1301). Then, the process A accesses the shared resource 1220 with a shared attribute and performs necessary processing (step 1302).

Suppose that exclusive access to the shared resource 1220 has become necessary in step B when the process A is executing step 1302. Accordingly, the process B issues a request to exclusively reserve a corresponding lock 1230 (step 1304). However, since the process A is executing step 1302, the lock 1230 is reserved with a shared attribute by the process A and the process B cannot exclusively reserve the lock 1230. The process B keeps spinning until the lock 1230 is freed (step 1305).

At this time (when the process B is executing step 1305), suppose that shared access to the shared resource 1220 has become necessary in process C. Accordingly, the process C issues a request to reserve a corresponding lock 1230 with a shared attribute (step 1307).

At his point, the process B has not yet exclusively reserved the lock 1230, which is still reserved with a shared attribute by the process A. Since process C also has a shared reservation attribute (the same as process A), it can reserve the lock 1230 without spinning to wait for the lock, and can immediately access the shared resource 1220 with a shared attribute (step 1309). Meanwhile, the process B still waits for the lock to be freed, in step 1305.

Suppose that the use of the shared resource initiated in step 1302 terminates in the process A and the lock 1230 is freed (step 1303, time t11 in FIG. 13). However, at this stage, the process B is in lock wait spin waiting for the lock 1230 to be freed and cannot yet reserve it with an exclusive attribute. This is because the lock 1230 is already reserved with a shared attribute by the process C. The process B cannot reserve the lock 1230 until the process C terminates use of the shared resource at step 1309 and frees the lock 1230 in step 1310. At this point (time t12), the process B can exclusively reserve the lock 1230 (step 1306) and can start processing using the shared resource 1220.

Although in FIG. 13, it is shown that only three processes access shared resources for convenience of explanation, more processes can generally exist. When the process C is executing step 1309, if another process attempts to gain shared access to the shared resource 1220, it can access the lock 1230 with a shared attribute just like the process C. As a result, further delay occurs before process B can exclusively reserve the lock 1230 (step 1306).

The flow of a series of processes can be repeated indefinitely. Accordingly, although each of the individual processes that reserve the lock 1230 with a shared attribute frees the lock 1230 after a limited period of time elapses, there occurs the situation where the process B cannot reserve the lock 1230 for an indefinite period of time. This is referred to as the aborting of preceding exclusive reservation requests due to preference for following shared reservation requests.

SUMMARY OF THE INVENTION

The use of the prior art allows resources shared among computers to be exclusively controlled. However, the problem described below exists.

On the occurrence of the need to access a shared resource, a computer program issues a lock-only command to the coupling facility to set a lock table item. However, if the reservation fails, since the same command is repeatedly sent, the system performance is reduced in the two points described below.

First, the computer program must send lock-only commands many times until a required shared resource is reserved, so that a load on the computer increases. More specifically, the load is simply wasted for waiting, not for user program processing. To avoid this, additional communication processing among computers is required. The more the number of computers waiting for the use of resources to be terminated, the larger the overhead of the communication processing itself, so that the processing capability of computers within the system cannot be used effectively.

Second, the use of the prior art causes lock-only commands to be repeatedly sent to the coupling facility, which must process the lock-only commands regardless of the success or failure in the setting of the table items. Accordingly, the coupling facility is likewise loaded. Generally in a parallel computer system, the coupling facility is a component which is liable to create a bottleneck in system performance, and therefore system architecture that minimizes the load placed on the coupling facilities is desired.

An object of the present invention is to provide a method for managing shared resources in a general-purpose parallel computer system which allows the computers and the coupling facility to be relieved of processing required for exclusive control of the shared resources.

As mentioned above, the conventional method for managing shared resources is by the use of spin locking having shared and exclusive attributes. However, this method can result in the problem of aborting the exclusive reservation requests for a lock.

Another object of the present invention is to provide a method for preventing the aborting of exclusive reservation requests in the exclusive control of shared resources by the use of spin locking having shared and exclusive attributes.

According to the invention, the coupling facility is provided with a table for keeping track of the use status of the shared resources. The coupling facility also has a resource request queue, and a table for registering the programs to use the shared resources. Further, unique identifiers in a system are assigned in advance to all of the computers in the system. Still further, unique identifiers in the system are assigned in advance to the programs that use the shared resources. Accordingly, the program identifiers and the identifiers of the computers on which the programs are executed are registered in the coupling facility.

To use a shared resource, a program asks the coupling facility for approval of the use of the shared resource, along with the program identifier. The coupling facility determines approval or disapproval of the use of the shared resource from the use status of the shared resource. If the program can use the shared resource, the coupling facility affords approval of the use of the shared resource to the program, and sets the program identifier in the table for keeping track of the use status of the shared resources to indicate that the program asking for approval of use is using the resource. If the program cannot use the shared resource, the coupling facility appends to the end of the shared resource request queue, an entry containing the identifier of the program that asked for approval of the use of the shared resource.

Whether the use of the shared resource is approved or disapproved, the result is sent to the program. The program that asked for approval of the use of the shared resource determines whether to perform processing using the shared resource, from the result of approval of the use of the shared resource that has been sent from the coupling facility. If the use of the shared resource is approved, the program that asked for approval of the use of the shared resource can start processing using the resource. If the use of the shared resource is disapproved, the program that asked for approval of the use of the shared resource, without immediately staring the processing using the resource, suspends the processing until approval of the use of the resource is reported from the coupling facility.

When the program terminates the use of the approved shared resource, it tells the coupling facility that the use of the resource is terminated. Upon receipt of the termination of the use of the shared resource from the program, the coupling facility sets an indication that no program is using the resource, in the table for keeping track of the use status of the resources. Then, if the resource request queue is not empty, the coupling facility fetches an entry sequentially from the beginning of the resource request queue, sets a program identifier contained in the entry in the resource use status table, determines from the program identifier the computer on which the program is being executed, and sends approval of the use of the resource to the computer.

Upon receipt of approval of the use of the shared resource, the program continues suspended processing and performs processing using the shared resource. When terminating the use of the shared resource, the program tells the coupling facility that the use of the resource is terminated. In this way, the present invention can provide a method for managing shared resources in a general-purpose parallel computer system which allows the computers and the coupling facility to be relieved of processing required for exclusive control of the shared resources.

Further, according to the invention, two locks (called first and second locks, respectively) are provided for each shared resource. Conventionally, only one lock has been provided for each shared resource. The procedure to gain exclusive access to a shared resource includes the following processing: (1) exclusively reserving a first lock corresponding to the shared resource, (2) exclusively reserving a second lock, and (3) freeing the first lock.

The procedure to gain shared access to a shared resource includes the following processing: (1) reserving, with a shared attribute, a first lock corresponding to the shared resource, (2) reserving, with a shared attribute, a second lock, and (3) freeing the first lock.

This minimizes the aborting of exclusive reservation requests in the exclusive control of shared resources by use of the spin locking having shared and exclusive attributes.

DETAILED DESCRIPTION OF THE PREFERRED EMBODIMENTS

Figure 1:
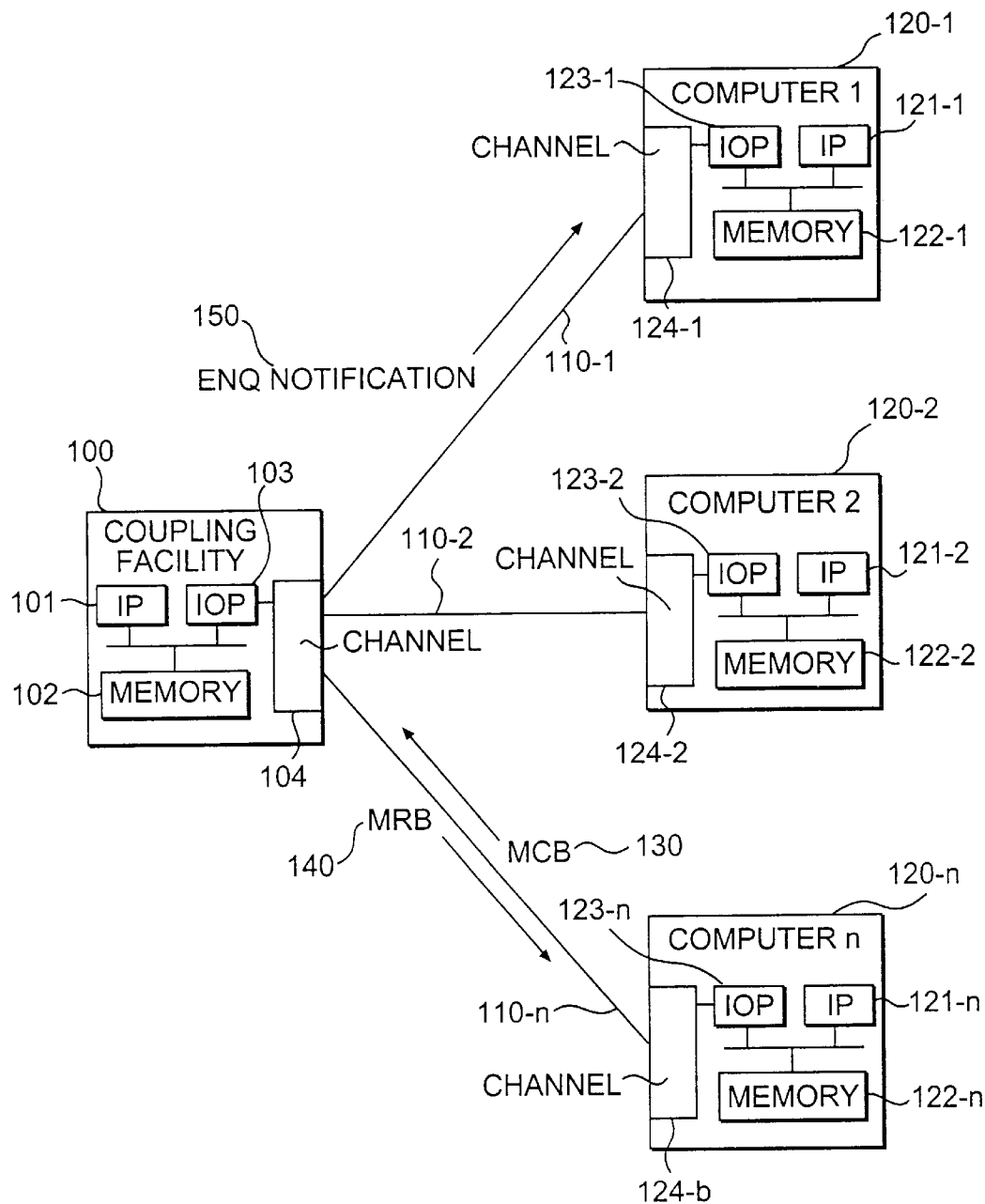
FIG. 1 is an overall diagram of a system according to an embodiment of the present invention.

Embodiments of the present invention will be described hereinafter in detail with reference to the accompanying drawings.

First, the following notations are used in the drawings and the specification. An 'A.B' notation in the figures means an element B contained in a table A. Similarly, an 'A.B[i]' means an i-th element B contained in a table A. Particularly in the flowcharts, 'A=B' denotes that B is assigned to A, and 'A==B' denotes that A and B are compared to see if they are equal. The notations are common in all of the figures and the specification.

The specification also defines new types of shared data objects in the coupling facility to manage resources shared among computers in a parallel computer system using the coupling facility. The shared data objects are referred to as enqueue structure types (ENQ structure types) throughout the specification. The ENQ structure types are created in the coupling facility by message commands newly defined in the specification, like the list structure types and cache structure types described in JP 6-44195, and the objects contained in the ENQ structure types are manipulated and deleted. The specification also provides detailed definitions for the objects in the ENQ structure types and message commands for manipulating the objects.

FIG. 1 is an overall diagram of a parallel computer system in which the present invention is embodied. Computers 120-1 to 120-n are connected to a coupling facility via intersystem channels 110-1 to 110-n. The computers 120-1 to 120-n comprise instruction processing units (IP) 121, memories 122, input-output processors (IOP) 123, and channels 124. The coupling facility 100, which also has the same hardware configuration as that of the computers 120-1 to 120-n, comprises IP 101, memory 102, IOP 103, and channel 104. The IOP is a dedicated processor for managing the channel.

The coupling facility 100 receives an MCB 130 sent via the intersystem channels 110-1 to 110-n from the computers 120-1 to 120-n and executes a predetermined command according to its contents. The MCB 130 consists of several operands. The command is specified by the operands contained in the MCB 130. On receiving the MCB 130, the coupling facility executes a command specified in the received MCB 130, creates an MRB 140 in accordance with the result, and sends it back to the computer 120 that sent the MCB 130. The MRB 140 consists of several operands like the MCB 130.

When the coupling facility 100 executes a command, there may occur a need to report a resulting change (e.g., acceptance of a reservation request for a suspended resource) of the status of the coupling facility 100 to a specific computer 120. This is also achieved by sending a specific memory block to a desired computer 120 via an intersystem channel 110. This is called an enqueue notification (ENQ notification) 150. The ENQ notification 150 also consists of several operands like the MCB 130. On receiving the ENQ notification 150, the computer 120 can determine from the operands of the ENQ notification 150 what change occurred in the coupling facility 100.

Figure 2:
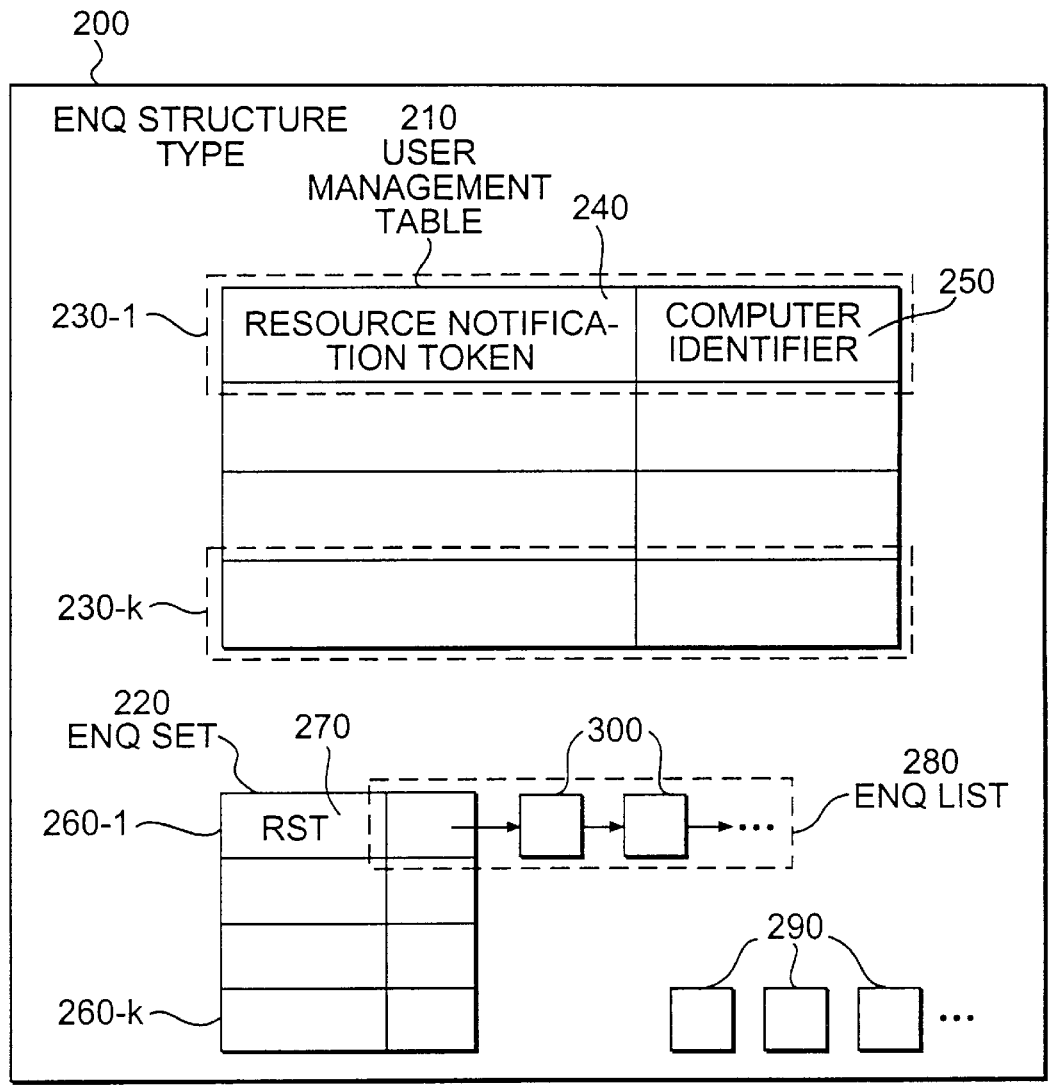
FIG. 2 is a diagram explaining an ENQ structure type.
Figure 3:
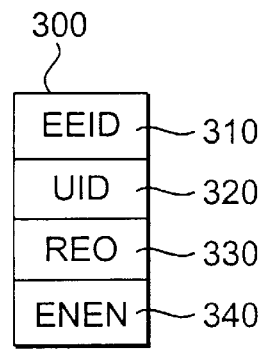
FIG. 3 is a diagram explaining ENQE.

FIGS. 2 and 3 are diagrams for explaining the object configuration of an ENQ structure 200. FIG. 2 shows objects contained in one ENQ structure type 200. The ENQ structure type 200 contains one user management table 210 and one enqueue set (ENQ set) 220. In addition to these, several enqueue entries (ENQE) 300 are also contained. All of these objects are defined in the ENQ structure type 200 when it is created.

The user management table 210 consists of lines 230-1 to 230-k and the k-th line 230 holds information about a program indicated by a user identifier (UID) i, where i is from 1 to the line count k of a user management table 210. Line 230 consists of resource notification token 240 and computer identifier 250. Here, the resource notification token is an identifier specific to an ENQ structure type 200 defined in the computers 120-1 to 120-n and the computer identifier is an identifier for the coupling facility 100 to uniquely specify the computers 120-1 to 120-n. The line count l of the user management table 210 is specified when the ENQ structure type 200 is created.

The ENQ set 220 consists of resources 260-1 to 260-k, and a resource 260 consists of resource status (RST) 270 and an enqueue list (ENQ list) 280. The line count k of the ENQ set 220 is specified when the ENQ structure type 200 is created. RST 270 is an object pointing to a program in which the resource 260 is used, and an ENQ list 280 points to a queue in which programs are waiting for the resource 280 to be freed. All the ENQ lists 280 are empty shortly after the ENQ structure type 200 is created.

The number of ENQEs 300 contained in one ENQ structure type 200 are defined in a definable range using all the storage areas left after the user management table 210 and ENQ set 220 are defined in the ENQ structure type 200. The ENQEs 300 that are not connected to an ENQ list 280 shortly after the ENQ structure type 200 is created are called free ENQEs 290.

FIG. 3 shows objects contained in an ENQE 300. The ENQE 300 consists of an enqueue entry identifiers (ENQE.EEID) 310, a user identifier ENQE.UID 320, a request indicator (ENQE.REQ) 330 and an enqueue notification number (ENQE.ENEN) 340. ENQE.EEID 310 is the identifier of ENQE 300 determined uniquely in the ENQ structure type 200 in which ENQE 300 is contained. This is determined by the coupling facility 100 when ENQE 300 is connected to an ENQ list 280 by a REGE command 420. Details of the REGE command 420 are given later. When ENQEs 300 are connected to the ENQ list 280, the value of an operand MCB.UID 530 contained in MCB 130 of the REGE command 420 is assigned to ENQE.UID 320. When ENQEs 300 are connected to the ENQ list 280, the value of an operand MCB.REQ 560 contained in MCB 130 of the REGE command 420 is assigned to ENQE.REQ.330. When ENQEs 300 are connected to the ENQ list 280, the value of an operand MCB.ENEN 570 contained in MCB 130 of the REGE command 420 is assigned to ENQE.ENEN 340.

Figure 4:
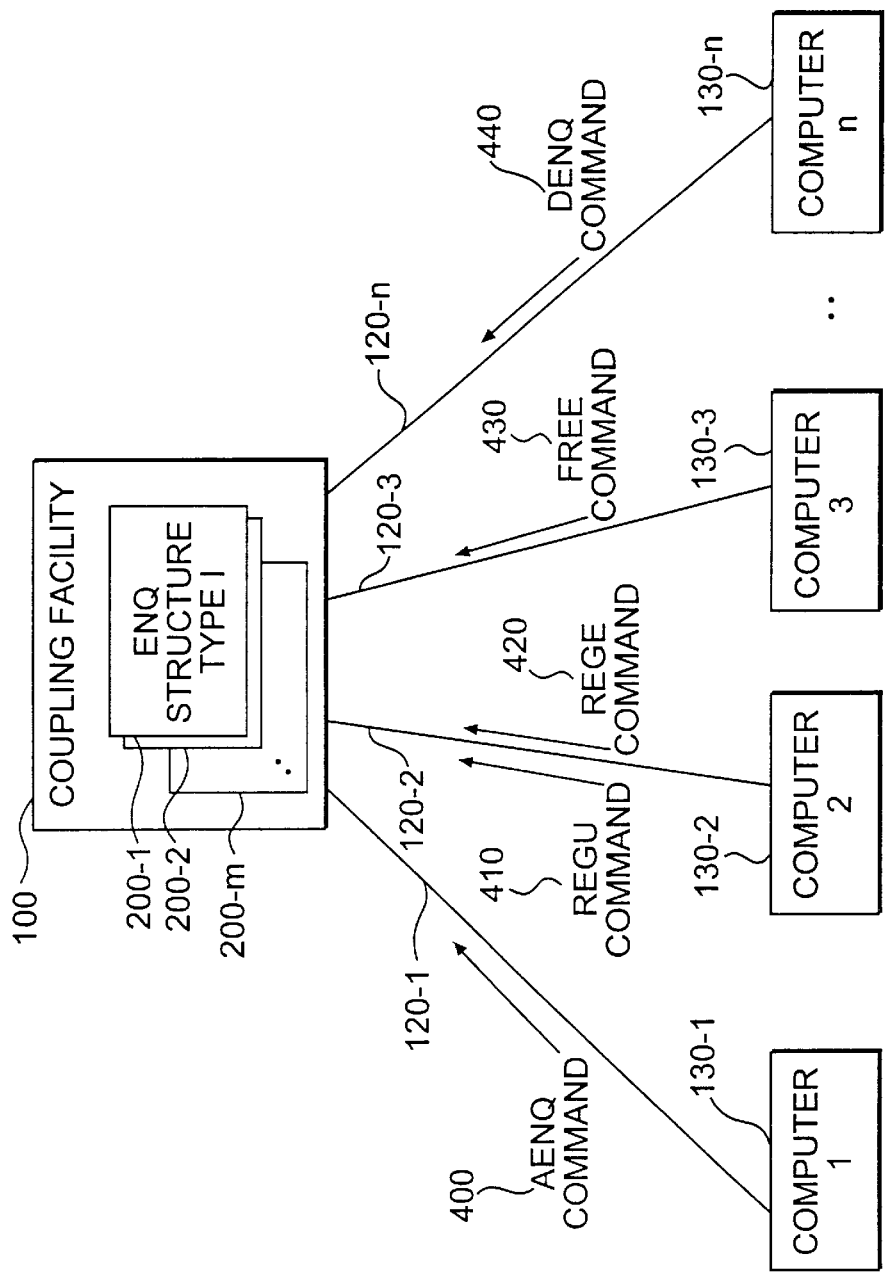
FIG. 4 is a diagram explaining the outline of shared resource management by use of an ENQ structure type.

FIG. 4 shows the outline of shared resource management by a coupling facility 100 according to an embodiment of the present invention. An ENQ structure type 200 is created in the coupling facility 100. Commands for manipulating an ENQ structure type 200 include an ENQ structure type allocation command (AENQ command) 400, an ENQ structure type deallocation command (DENQ command) 440, a user registration command (REGU command) 410, a resource reservation command (REGE command) 420, and a resource free command (FREE command) 430. Of these commands, the processing of the REGE command 420 and the FREE command 430 will be described in detail later.

A plurality of ENQ structure types 200 can be defined in the coupling facility 100. Commands to manipulate an ENQ structure type 200 specify the ENQ structure to be manipulated, by specifying the SID of the ENQ structure in the SID operand contained in MCB 130.

The shared resource management is started by sending the MCB 130 with an AENQ command 400 specified for the coupling facility 100 to create the ENQ structure type 200 for managing shared resources in the coupling facility 100 (hereinafter, sending the MCB 130 with a command specified for the coupling facility 100 is simply referred to as sending a command).

If a memory 102 of the coupling facility 100 has sufficient free area to create the ENQ structure type 200 requested by the AENQ command 400 and if the SID specified in the MCB 130 of the AENQ command 400 is not used by other structure types, the coupling facility 100 creates the ENQ structure type 200 in the memory 102 and sends back an MRB 140 to the computer 120 that sent the AENQ command 400, to indicate that it has been created successfully.

If the memory 102 of the coupling facility 100 does not have sufficient free area to create the ENQ structure type 200 requested by the AENQ command 400 or if the SID specified in the MCB 130 of the AENQ command 400 is already used by other structure types, an attempt to create the ENQ structure type 200 by the AENQ command 400 fails and the coupling facility 100 sends back an MRB 140 to the computer 120 that sent the AENQ command 400, to indicate that it has not been successfully created. When the AENQ command succeeds, thereafter, programs on the computer 120 can use commands for manipulating the ENQ structure type 200 by specifying the SID specified in the MCB 130 of the AENQ command.

A program using shared resources that is executed on computers 120-1 to 120-n first registers an UID in the ENQ structure type 200 by using the REGU command 410.

Each of the programs using shared resources on computers 120 predetermines a unique UID and, by the REGU command 410, registers a UID and a resource notification token 240 defined to identify the ENQ structure type 200 within the computers 120 in the user management table 210 of the ENQ structure type 200 for managing shared resources. On receiving the REGU 410 command, the coupling facility 100 obtains a line 230 of the user management table 210 from the UID contained in MCB 130 of the REGU command 410. The computer identifier of the computer that sent the REGU command and the resource notification token contained in the MCB 130 of the REGU command is registered in the computer identifier 250 and the resource notification token 240, respectively of the line 230. These information items are used to send ENQ notification 150 to a program corresponding to the registered UID.

When the REGU command 410 succeeds, the UID specified by the REGU command 410 is associated with the program and is subsequently used to manage the program within the ENQ structure type 200.

When a program on the computers 120-1 to 120-n uses a shared resource, in order that the RST 270 contained in a resource 260 of an ENQ structure type 200 associated with shared resources is set so that the program is using the resource, the REGE command 420 is sent to the coupling facility 100. After the use of the resource 260 is approved by the coupling facility 100, the program can perform processing using a shared resource corresponding to the resource 260. When the processing using the shared resource terminates, the program uses the FREE command 430 to tell the coupling facility 100 that the use of the resource 260 corresponding to the shared resource is terminated. Processing of the REGE command 420 and FREE command 430, and the procedure for exclusive control of the resources by the use of these commands will be described in detail later.

The RST 270 contained in a resource 260 is set to indicate that a program associated with a UID whose value is "a" (a predetermined variable) is using the resource 260. This is referred to as "a reserves a resource 260". Likewise, RST 270 contained in a resource 260 is also set to indicate that a program associated with UID whose value is "a" is not using the resource 260. This is referred to as "a frees a resource 260".

If it has become unnecessary to manage a shared resource, to delete the ENQ structure type 200 having managed the shared resource from the coupling facility 100, a DENQ command 440 is sent to the coupling facility 100. On receiving the DENQ command 440, the coupling facility 100 deletes the ENQ structure type 200 having the SID specified in MCB 130 of the DENQ command 440 from memory 102 and returns the storage area the ENQ structure type 200 has been using to a free area.

Although only one command for each of all the command types is shown in FIG. 4, it should be understood that the AENQ command 400 and DENQ command 440 are issued for each start and termination of shared resource management, the REGU command 410 is issued each time a program using shared resources managed by the ENQ structure type 200 is started, and the REGE command 420 and FREE command 430 are issued each time a program performs processing using the resources.

The REGE command will be described with reference to FIGS. 5, 6, and 7.

Figure 5:
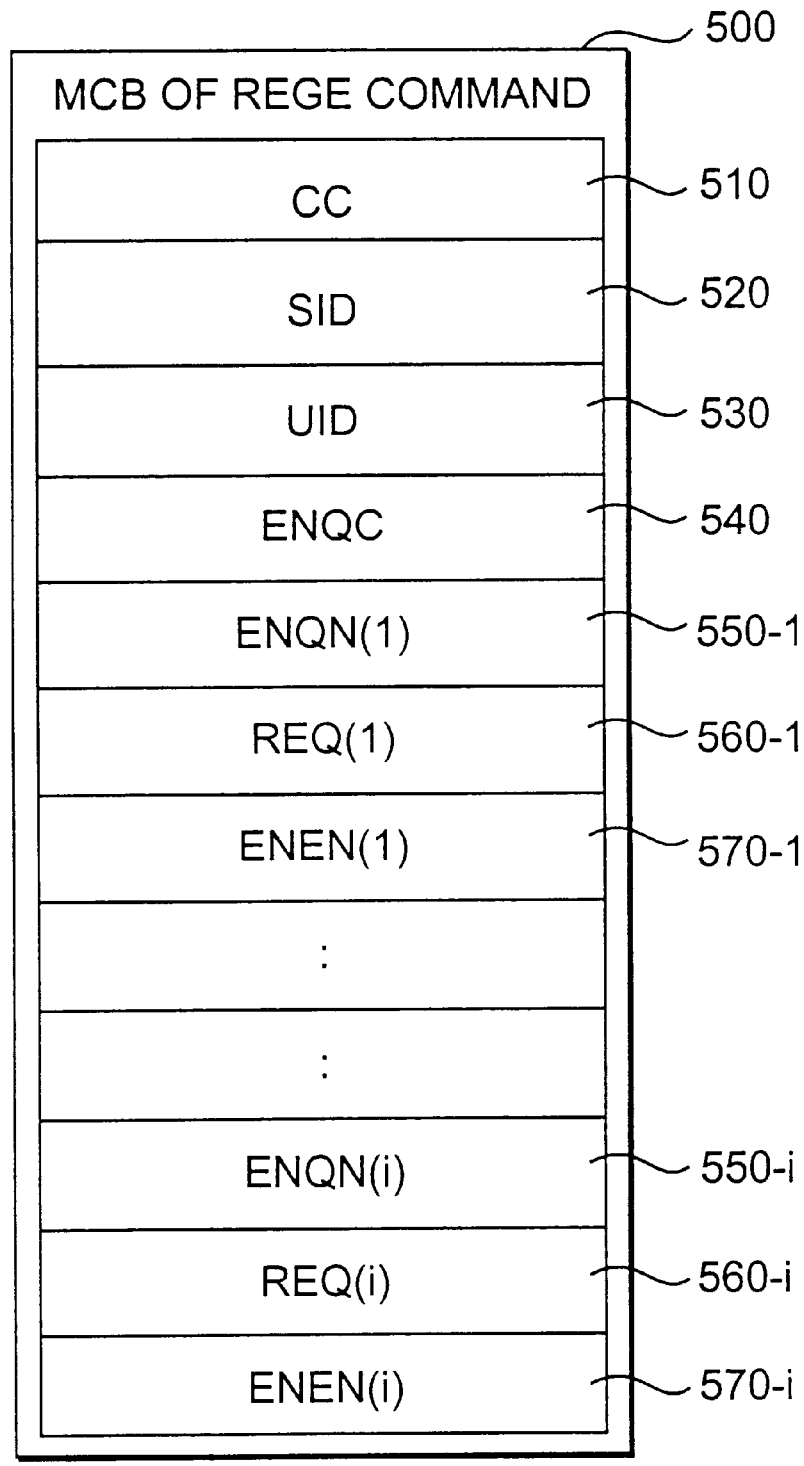
FIG. 5 is a diagram explaining an MCB of a REGE command.

FIG. 5 shows the format of MCB 130 used in the REGE command 420. An instruction code (MCB.CC) 510 is a code indicating a command; it indicates that a command started by the MCB 130 is the REGE command 420. MCB.SID 520 specifies the SID of an ENQ structure type 200 manipulated by the REGE command 420. MCB.UID 530 is the UID of the program that issued the REGE command 420. Enqueue count (MCB.ENQC) 540 contains the number of sets of MCB.ENQN 550, MCB.REQ 560, and MCB.ENEN 570. Enqueue number (MCB.ENQN) 550 is an operand for specifying a resource 260 in an ENQ set 220. Request type (MCB.REQ) 560 is an operand for specifying whether to gain exclusive or shared access to shared resources. Enqueue notification entry number (MCB.ENEN) 570 is an operand for specifying ENEN used to send ENQ notification 150 that indicates that a resource is freed.

Figure 6:
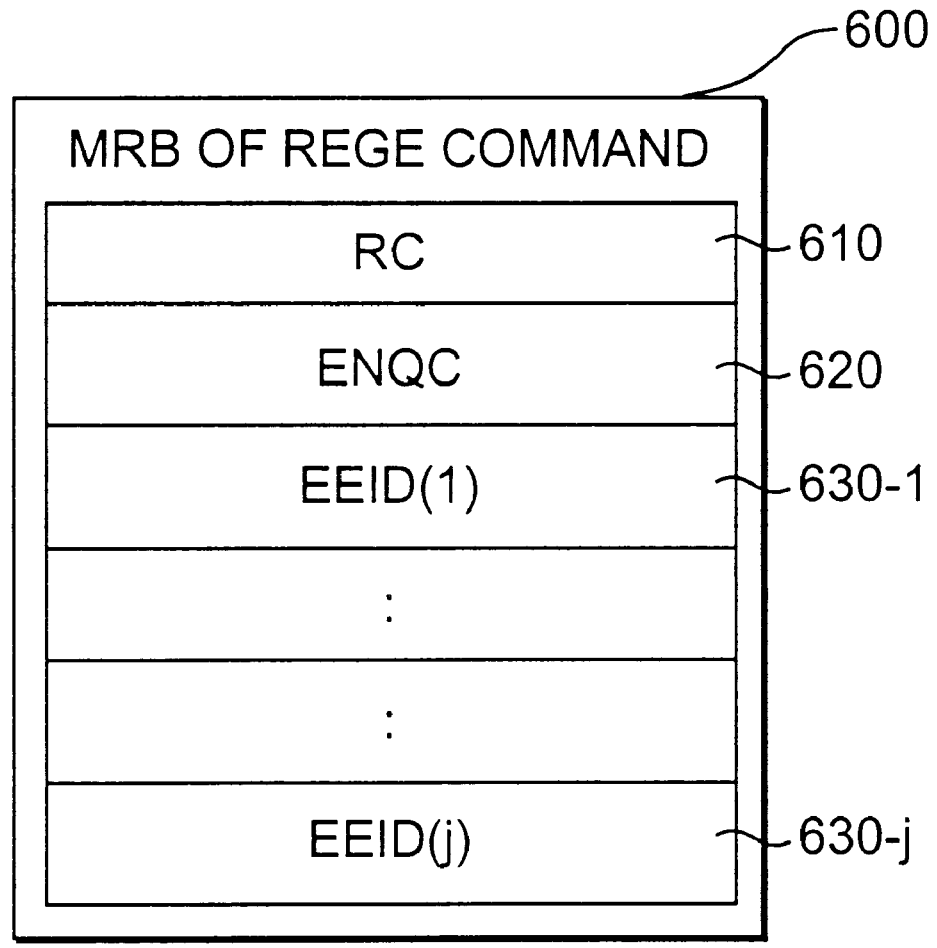
FIG. 6 is a diagram explaining an MRB of a REGE command.

FIG. 6 shows the format of MRB 140 used by the REGE command 420. Response code (MRB.RC) is a code indicating the execution result of the REGE command 420. MRB.ENQC 620 contains the number of valid MRB.EEIDs 630 contained in the MRB 600. MRB.EEID 630 is the EEID of ENQE 300 created by the REGE command 420. Only when the resource reservation fails, ENQE 300 is created and a valid ENQE.EEID 310 is assigned. Zero is set when a resource is reserved successfully and the ENQE 300 is not created. It should be understood that MCB.ENQN 550, MCB.REQ 560, and MCB.ENEN 570 shown in FIG. 5, and MRB.EEID 630 shown in FIG. 6 are associated by a subscript (i).

Figure 7:
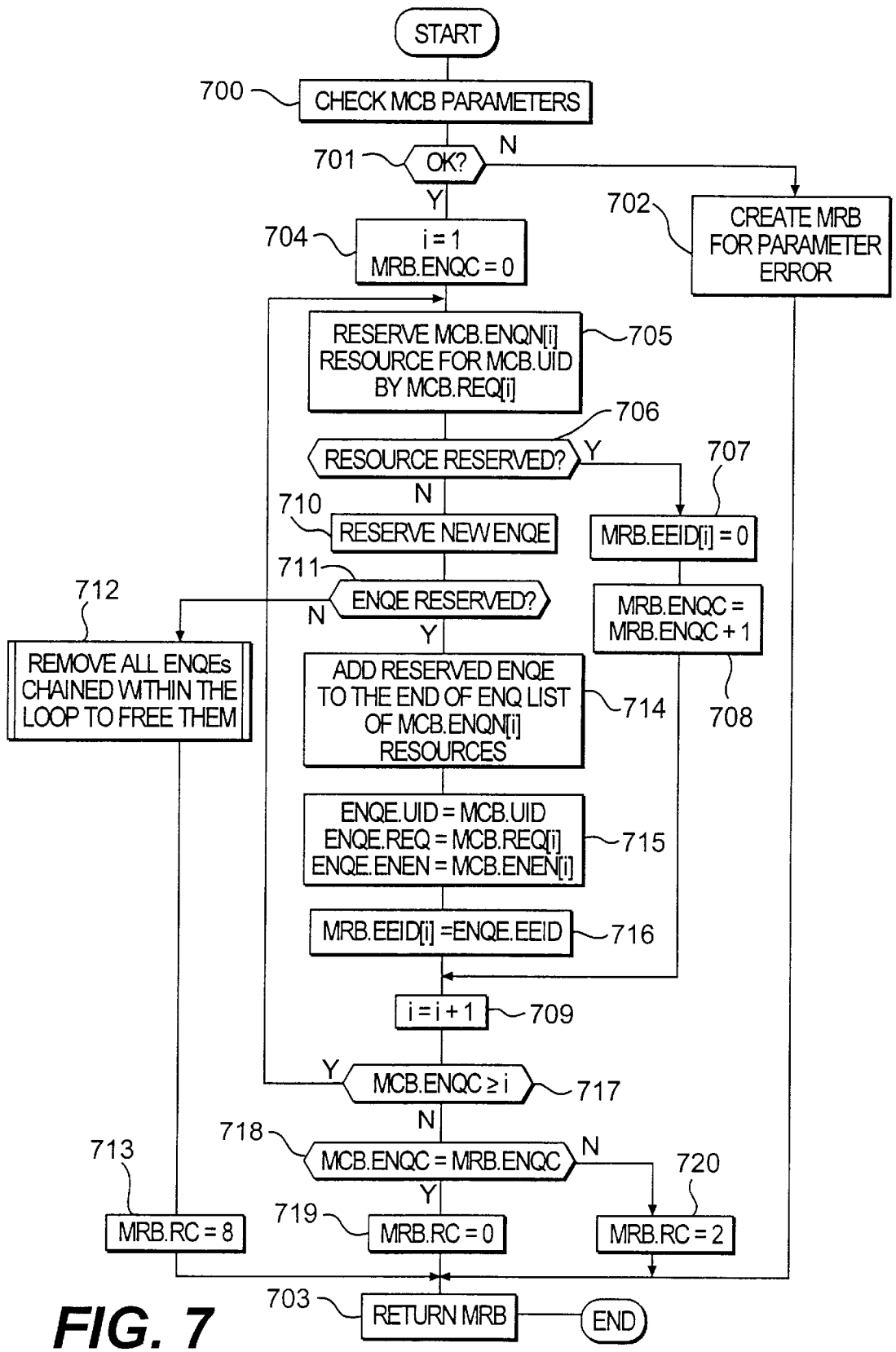
FIG. 7 is a flowchart of a REGE command.

FIG. 7 is a flowchart showing the REGE command 420.

On receiving the REGE command 420, the coupling facility 100 first checks parameters contained in MCB 500 for validity (step 700). A parameter error, for example, occurs in the case when the SID of ENQ structure type 200 not created by the AENQ command 400 is specified in MCB.SID 520, and also in the case when the UID is not registered by the REGU command 410 is specified in MCB.UID 530.

If at least one of the parameters contained in the MCB 500 is invalid (failure in step 701), the coupling facility 100 creates MRB 140 for the parameter errors (step 702) and jumps to step 703. If step 701 succeeds, the coupling facility 100 initializes an internal variable i and MRB.ENQC 620 to 0, respectively (step 704).

Next, the coupling facility 100 checks the RST 270 of a resource 260 pointed to by the MCB.ENQN [i] 550-i and determines whether a program pointed to by MCB.UID 530 can use the resource 260 with the shared or exclusive attribute indicated by the MCB.REQ [i] 560-i (step 705).

If MCB.UID 530 can reserve the resource 260 pointed to by MCB.ENQN[i] 550-i (the flow passes along the branch in step 706), the coupling facility 100 sets in RST 270 of the resource 260 a value indicating that MCB.UID 530 is using the resource, sets MRB.EEID[i] 630-i to 0 (step 707), adds 1 to MRB.ENQC 620 (step 708), and jumps to step 709.

If the attempt to reserve the resource in step 706 fails (the flow proceeds on the N branch), the coupling facility 100 reserves one free ENQE 290 in the ENQ structure type 200 (step 710). If a free ENQE 290 cannot be reserved (N branch flow in step 711), the coupling facility 100 removes all the ENQEs 300 chained to the ENQ list 280 during processing of the REGE command 420 and returns all the removed ENQEs 300 to the free ENQEs 290 again (step 712), sets MRB.RC 610 to 8 (step 713), and jumps to step 703.

If a free ENQE 290 can be reserved (Y branch flow in step 711), the coupling facility 100 connects the reserved ENQE 300 to the end of the ENQ list 280 of resource 260 pointed to by the MCB.ENQN[i] 550-i (step 714), and assigns MCB.UID 530 to ENQE.UID 320 of ENQE 300, MCB.REQ[i] 560-i to ENQE.REQ 330, and MCB.ENEN[i] 570-i to ENQE.ENEN 340, respectively. Then, ENQE.EEID 310 is assigned to MRB.EEID[i] 630-i (step 716). In step 709 increments the internal variable I is incremented by 1 to perform processing for the next set of MCB.ENQN 550, MCB.REQ 560, and MCB.ENEN 570.

In step 717, the internal variable (i) is compared with MCB.ENQC 540, and if MCB.ENQC 540 is greater or equal to (i) (branch Y flow in step 717), it returns to step 705. If the internal variable (i) is greater than MCB.ENQC 540 (branch N flow in step 717), the flow proceeds to step 718. Step 718 compares MCB.ENQC 540 with MRB.ENQC 620. If these are equal (branch Y flow in step 718), it sets MRB.RC 610 to 0 (step 719). Or, when the comparison results in the valves being unequal (branch N flow in step 718), MRB.RC610 is set to 2 (step 720).

In step 703 which follows each of Steps 719 and 720, as well as Steps 702 and 713, as aforementioned, an MRB 140 is sent back to the computer 120 that issued the REGE command 420.

The FREE command will be described with reference to FIGS. 8, 9, and 10.

Figure 8:
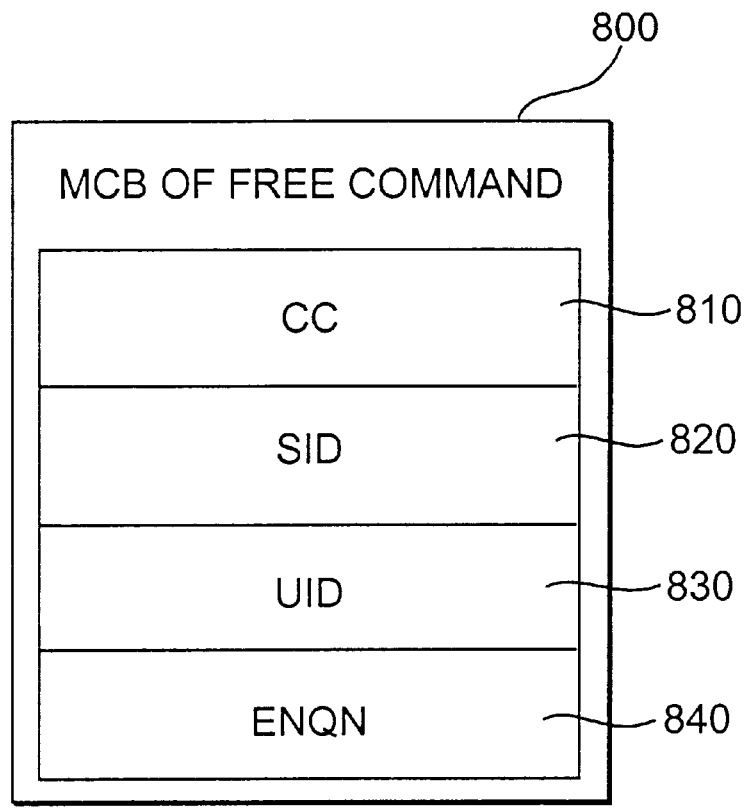
FIG. 8 is a diagram explaining an MCB of a FREE command.

FIG. 8 shows the format of an MCB 130 used with the FREE command 430. MCB.CC 510 is a code indicating a command which indicates that the command started by the MCB 130 is the FREE command 430. MCB.SID 820 specifies the SID of an ENQ structure type 200 manipulated by the FREE command 430. MCB.UID 830 is the UID of a program that issued the FREE command 430. MCB.ENQN 840 is an operand for specifying the resource 260 of an ENQ set 220.

Figure 9:
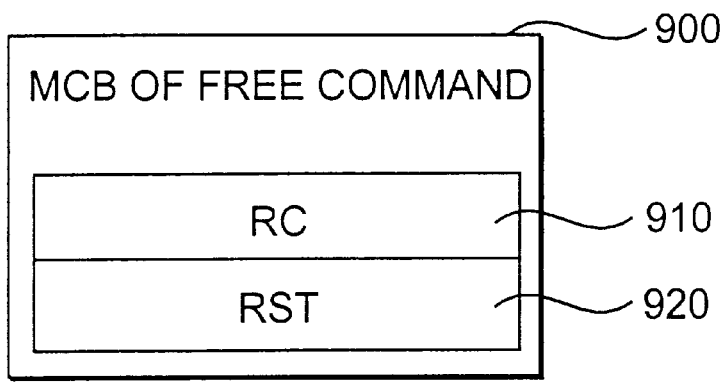
FIG. 9 is a diagram explaining an MRB of a FREE command.

FIG. 9 shows the format of an MRB 140 used with the FREE command 430. MRB.RC 910 is a code indicating the execution results of the FREE command 430. MRB.RST 920 is the RST 270 contained in the resource 260 pointed to by MCB.ENQN 840 of the FREE command 430.

Figure 10:
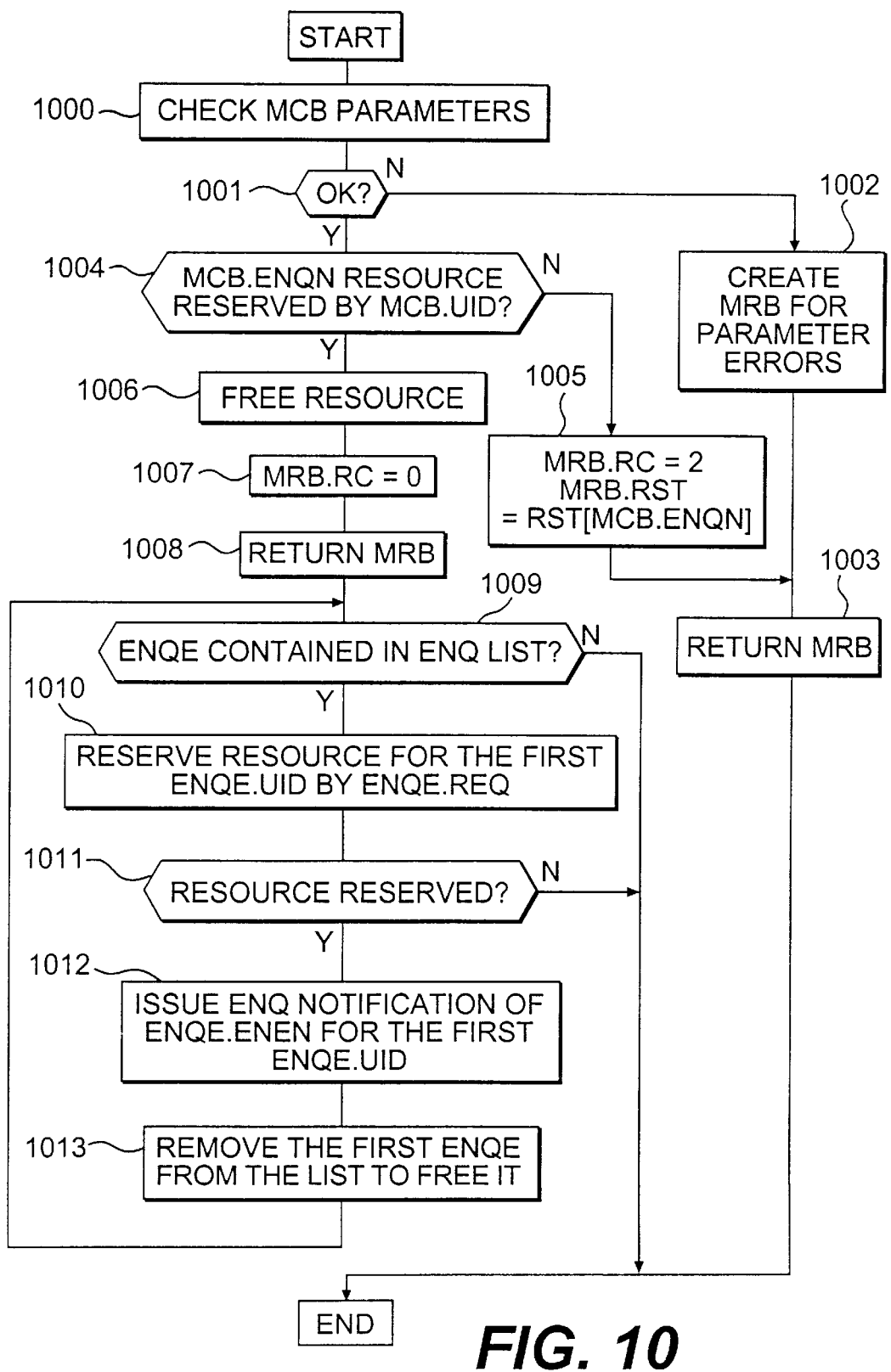
FIG. 10 is a flowchart of a FREE command.

FIG. 10 is a flowchart showing the processing of FREE command 430. On receiving the FREE command 430, the coupling facility 100 first checks parameters contained in the MCB 800 for validity (step 1000). A parameter error, for example, will occur in the event that the SID of an ENQ structure type 200 not created by the AENQ command 400 is specified in the MCB.SID 820, and in the event that a UID not registered by the REGU command 410 is specified in the MCB.UID 830.

If at least one of the parameters contained in the MCB 800 is invalid (branch flow N in step 1001), the coupling facility 100 creates MRB 140 for the parameter errors (step 1002), returns the MRB 140 to the computer 120 that issued the FREE command 430 (step 1003), and terminates the processing of the FREE command.

If step 1001 succeeds (branch Y flow), the coupling facility 100 checks whether the resource 260 pointed to by MCB.ENQN 840 is reserved by the program pointed to by MCB.UID 830 (step 1004). If the resource 260 is not reserved by the program pointed to by MCB.UID 830 (branch N flow in step 1004), the coupling facility 100 sets MRB.RC 910 to 2 and MRB.RST 920 to RST 270 contained in the resource 260 (step 1005), and jumps to step 1003. If the resource 260 is reserved by the program pointed to by MCB.UID 830 (branch Y flow in step 1004), the coupling facility 100 frees the resource 260 (step 1006), sets MRB.RC 910 to 0 (step 1007), and returns the MRB 140 to the computer 120 that issued the FREE command 430 (step 1008).

Next, the coupling facility 100 checks whether ENQE 300 is connected to the ENQ list 280 contained in the resource 260 (step 1009). If the ENQ list 280 is empty (branch N flow in step 1009), the coupling facility 100 terminates processing without doing anything. If the ENQE 300 is determined to be connected to the ENQ list 280 (branch Y flow in step 1009), the coupling facility 100 attempts to reserve the resource 260 with a shared or exclusive attribute indicated by ENQE.REQ 330 for the program pointed to by ENQE.UID 320 of ENQE 300 in the beginning of the ENQ list 280 (step 1010). If ENQE.UID 320 cannot reserve the resource 260 (N in step 1011), the coupling facility 100 terminates processing without doing anything.

If the ENQE.UID 320 can reserve the resource 260 (branch Y flow in step 1011), the coupling facility 100 obtains a line 230 of the user management table 210 from ENQE.UID 320 and sends, to the computer 120 having the computer identifier 250 contained in the line 230, the ENQ notification 150 containing the resource notification token 240 registered in the line 230 and the ENQ notification no. ENQE.ENEN 340 (step 1012). The program receiving the ENQ notification 150 can determine, from the resource notification token and the ENEN contained in the ENQ notification 150, that a resource has been reserved, and can start processing using a shared resource corresponding to the resource 260. In step 1013 the first ENQE 300 from the ENQ list 280 is removed to make it a free ENQE 290 (step 1013), after which the flow returns to step 1009.

Figure 11:
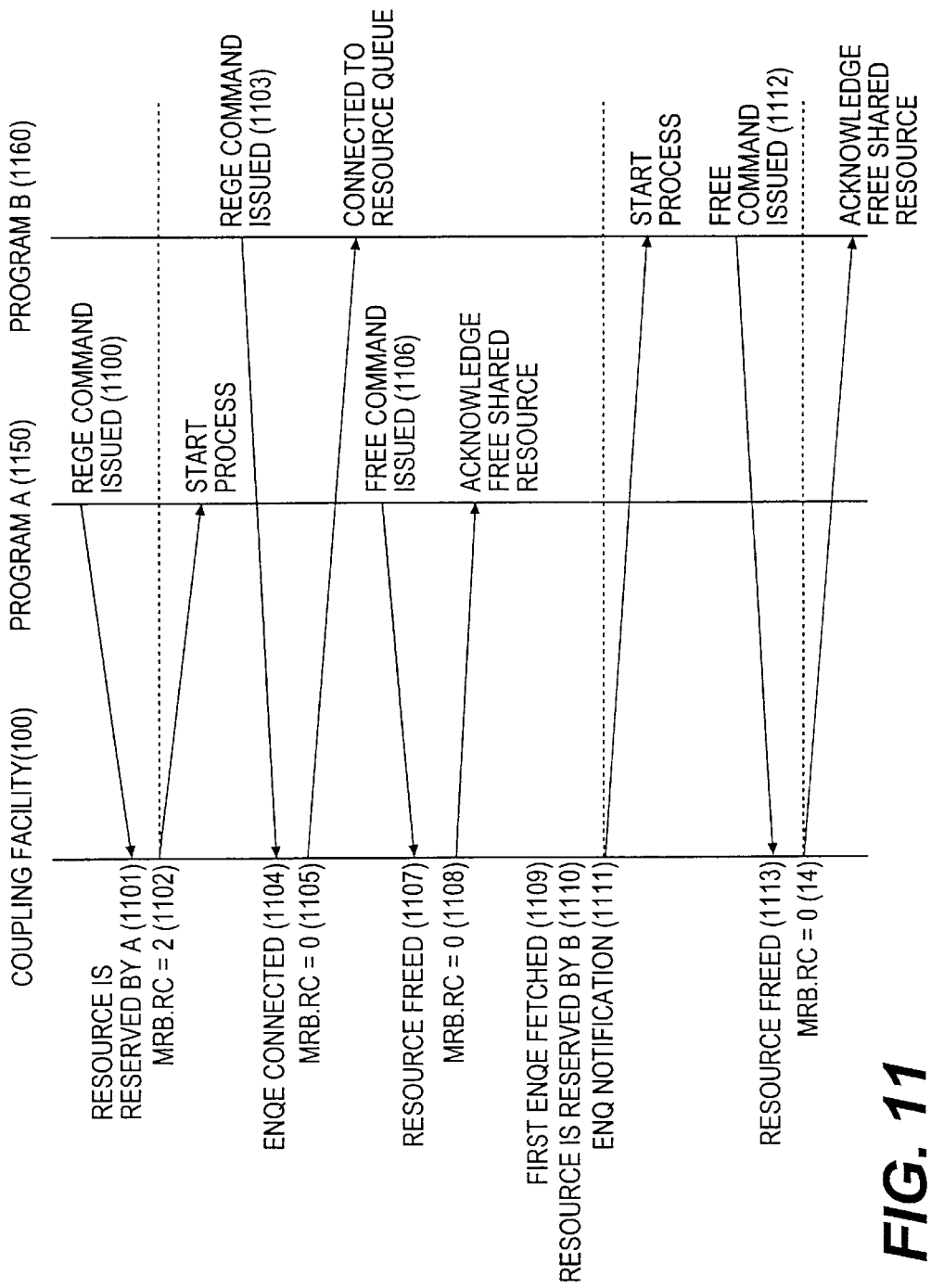
FIG. 11 is a flowchart of a resource exclusion method according to an embodiment of the present invention.

FIG. 11 shows a method for managing resources shared among programs on computers 120-1 to 120-n, using the commands and objects described in connection with the invention. FIG. 11 is a flowchart in which a program on a computer A (hereafter called a program A (1150)) and a program on a computer B (hereafter called a program B (1160)) request the same resource in the order from A to B. The creation of an ENQ structure type 200 and UID registration, already shown in FIG. 4, are omitted in FIG. 11. To simplify explanation, both programs reserve shared resources with an exclusive attribute.

First, in order for the program A (1150) to use a shared resource, an attempt is made to reserve a resource 260 associated with the shared resource in advance. The program A (1150) specifies the UID of the program A (1150) registered in advance in MCB.UID 530, ENQN of resource 260 in MCB.ENQN 550, and SID of ENQ structure type 200 containing the resource 260 in MCB.SID 520, and issues the REGE command 420 to the coupling facility 100 (step 1100).

Since the resource is free at this point, the coupling facility 100 sets in the RST 270 of the resource 260 specified in MCB.ENQN 550 an indication that MCB.UID 530 is using the resource (step 1101), and returns MRB 140 with MRB.RC 610 set to 0 (step 1102). The program A (1150) thus recognizes that the use of the resource 260 has been approved, and starts processing using a corresponding shared resource.

Subsequently, in order for the program B (1160) to use the same shared resource, the program B (1160) specifies the same SID and ENQN as the program A (1150) in MCB.SID 520 and MCB.ENQN 550 respectively, specifies the program B (1160) UID registered in advance in MCB.UID 530, and issues the REGE command 420 to the coupling facility 100 (step 1103). However, since the resource 260 is being used by the program A (1150), the coupling facility 100 connects ENQE 300 to the end of ENQ list 280 (empty in this example) (step 1104), assigns MCB.UID 530 to ENQE.UID 320 of ENQE 300, MCB.REQ 560 to ENQE.REQ 330, and MCB.ENEN 570 to ENQE.ENEN 340, and returns MRB 140 with MRB.RC 610 set to 2 (step 1105). The program B (1160) determines from this that the resource is being used by another program, thus suspending processing by use of the resource.

After terminating processing by use of the resource, the program A (1150) issues the FREE command 430 to the coupling facility 100 to report the termination of processing (step 1106). On receiving the FREE command, the coupling facility 100 frees the resource 260 specified in MCB 130 of the FREE command 430 (step 1107), and returns MRB 140 with MRB.RC 910 set to 0 (step 1108).

Further, the coupling facility 100 fetches the first ENQE 300 from the ENQ list contained in the resource 260 (step 1109), and uses ENQE.UID 320 and ENQE.REQ 330 in ENQE 300 to set in RST 270 of the resource 260 an indication that ENQE.UID 320 is using the resource (step 1110). To report the reservation of the shared resource to the program B (1160), the coupling facility 100 obtains a computer identifier 250 and resource notification token 240 from the line 230 of the user management table 210 indicated by ENQE.UID 320, and sends, to the computer (computer B in this example) having the computer identifier, the ENQ notification 150 containing the resource notification token 240 and ENEN in ENEN 340 (step 1111). The program B (1160) can determine which resource 260 has been approved for use, from the resource notification token and ENEN contained in the ENQ notification 150, and can start processing using a shared resource.

Finally, after terminating processing by use of the shared resource, the program B (1160) issues the FREE command 430 to the coupling facility 100 to report the fact (step 1112). On receiving the FREE command 430, the coupling facility 100 returns the state of the resource 260 specified in MCB 130 of the FREE command 430 to a free state (step 1113) and returns MRB 140 with MRB.RC 910 set to 0 (step 1114).

It will be understood that, whether or not a desired resource is reserved successfully when the REGE command 420 is issued, programs on computers 120-1 to 120-n need not send further commands to the coupling facility 100. The coupling facility 100 actively sends ENQ notification 150, triggered by the FREE command 430, so the computers 120-1 to 120-n can proceed to other processing without monitoring freeing of a resource 260 regardless of failure in resource reservation by the REGE command 420. Further, since the FREE command sends ENQ notification 150 only to a computer 120 that registered a ENQE 300, the processing by the coupling facility 100 is minimized. Processing can be performed according to the same procedure, regardless of an increase in the number of computers 120 and the number of programs on the computers 120.

Figure 12:
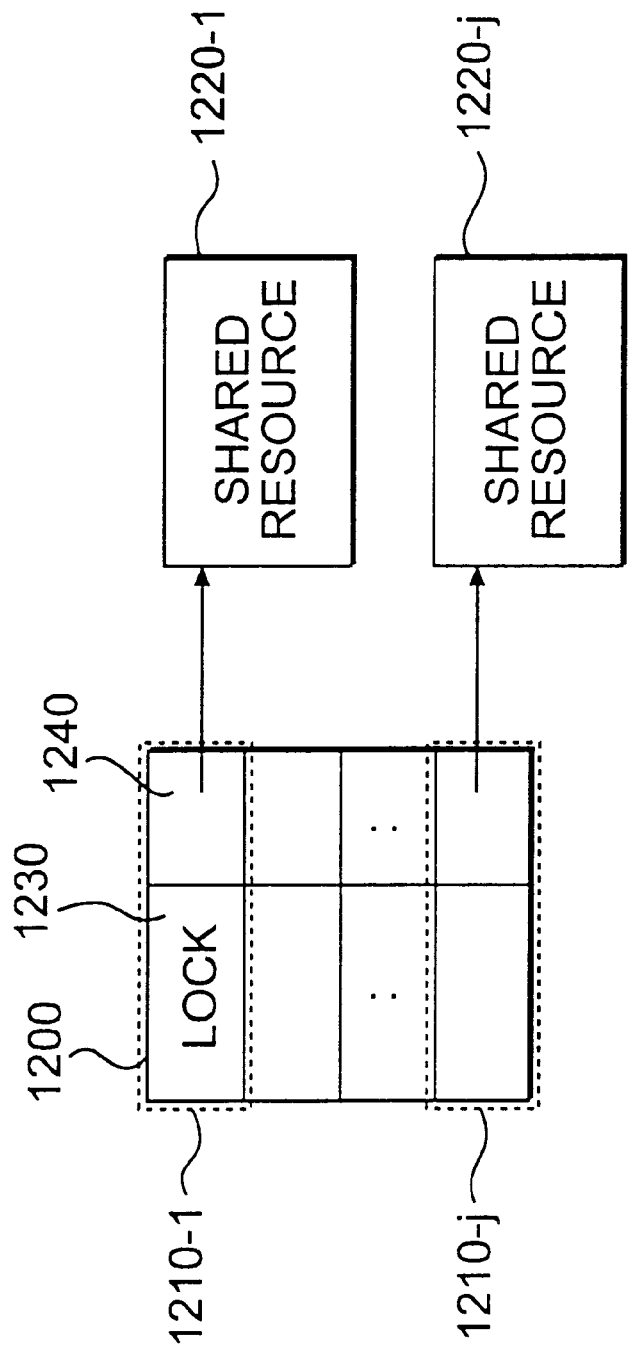
FIG. 12 is one example of a resource management table according to a conventional method.
Figure 14:
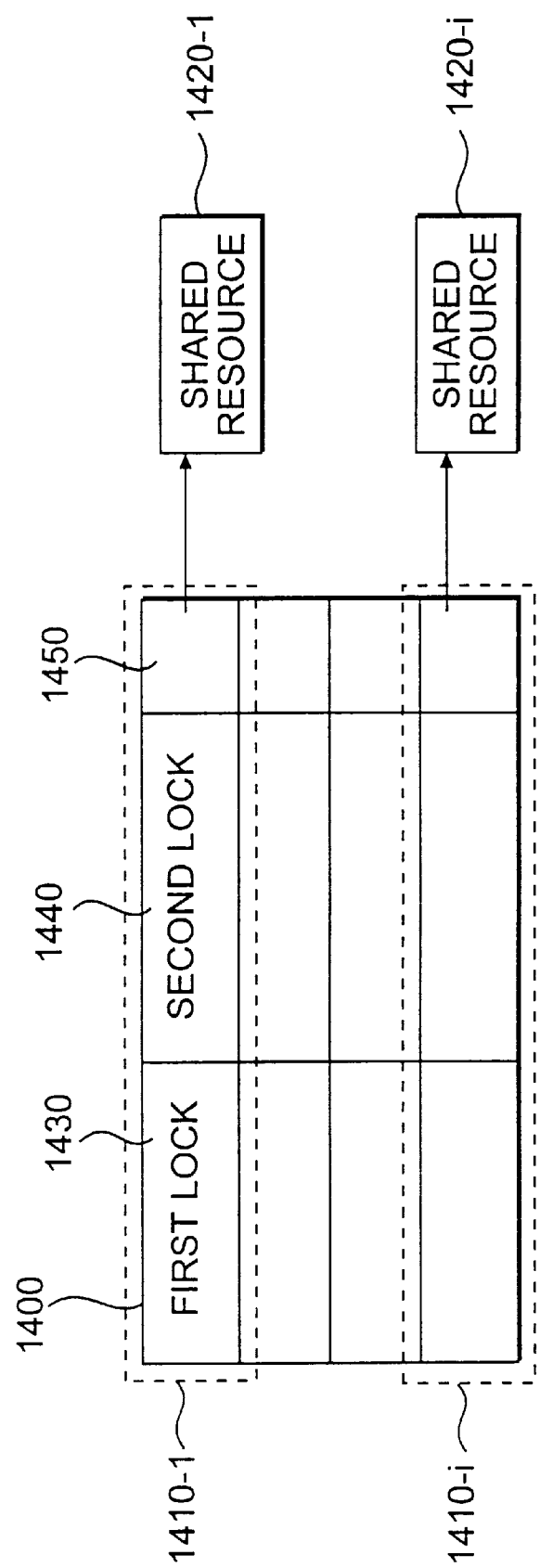
FIG. 14 is one example of a resource management table according to an embodiment of the present invention.

FIG. 14 shows an example of a resource management table according to the present invention. The resource management table 1400 has lines 1410-1 to 1410-i, which are associated with shared resources 1420-1 to 1420-i by resource pointers 1450. Each line 1410 contains a first lock 1430 and a second lock 1440. The first lock 1430 and second lock 1440 each are exactly the same as a lock 1230 in FIG. 12.

Figure 13:
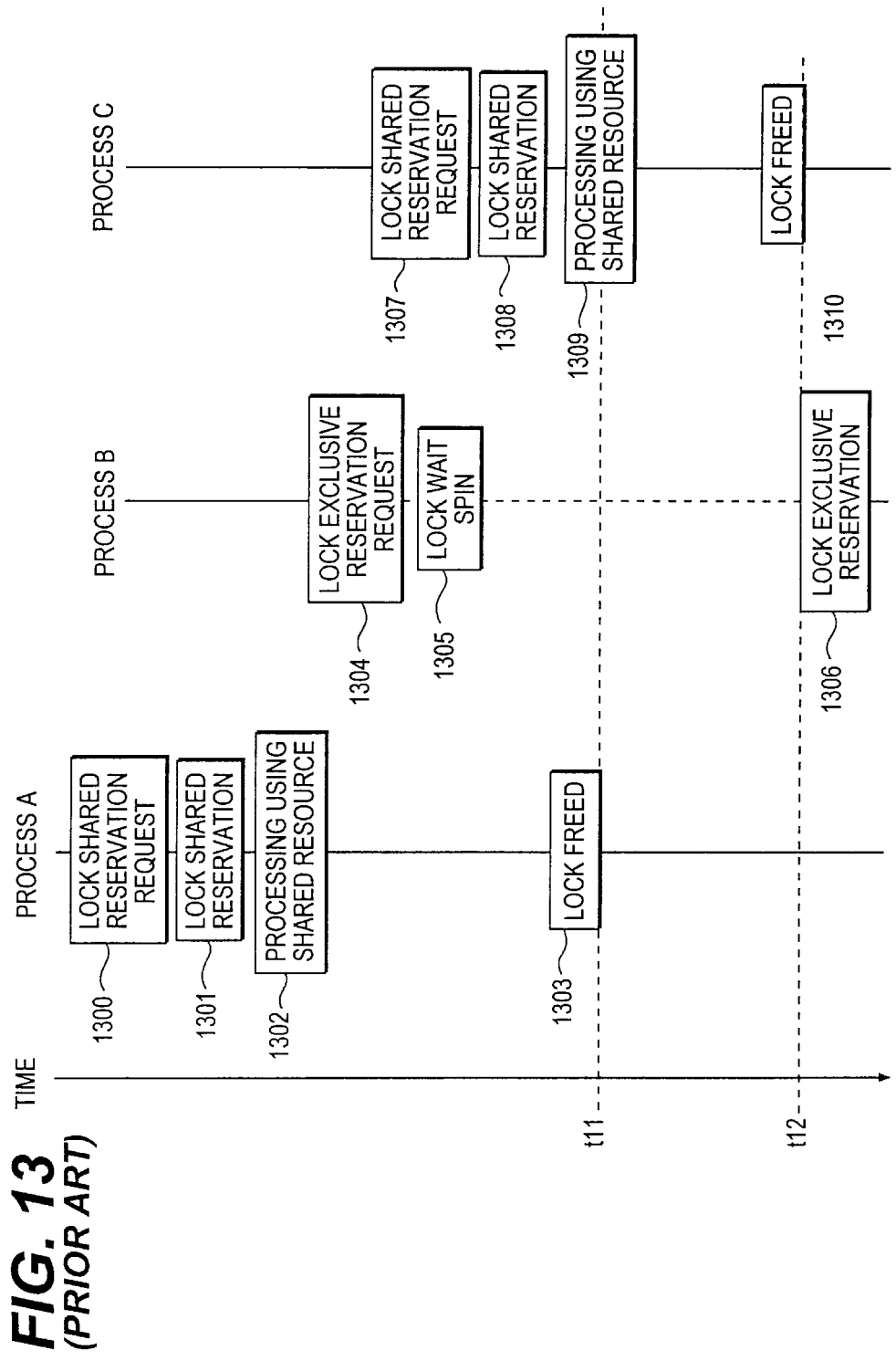
FIG. 13 is a flowchart of a resource management method according to a conventional method.
Figure 15:
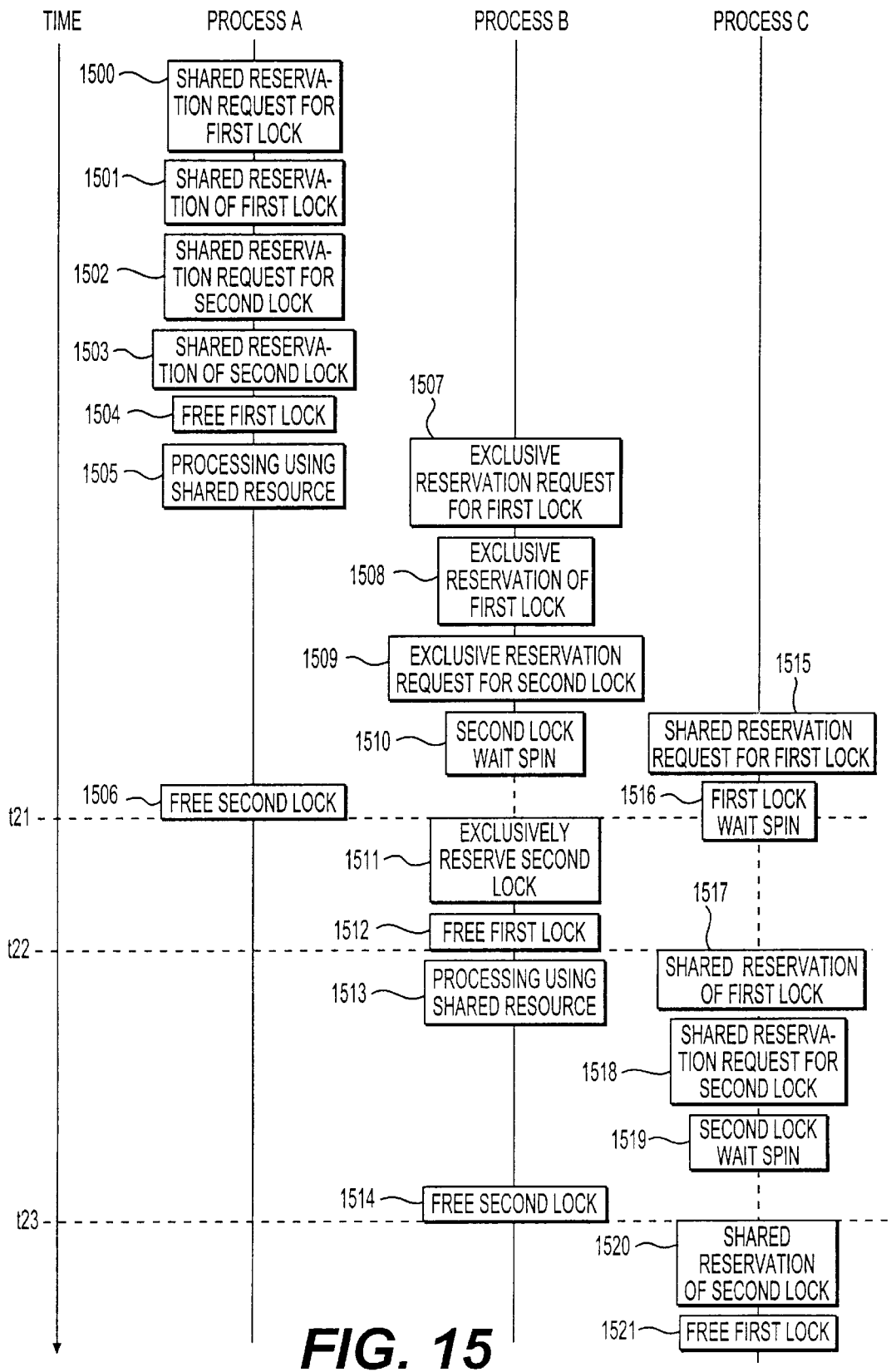
FIG. 15 is a flowchart of a resource management method according to an embodiment of the present invention.

FIG. 15 is a flowchart showing resource exclusive processing according to an embodiment of the present invention that is comparable with prior art FIG. 13. The flowchart shows lock reservation states when one shared resource 1420 is requested with shared, exclusive, and shared attributes by processes A, B, and C in that order.

To gain shared access to a shared resource 1420, the process A first issues a request to reserve a corresponding first lock 1430 with a shared attribute (step 1500). Since the first lock 1430 is not reserved by any process at this point, it is immediately reserved by the process A with a shared attribute (step 1501). Next, the process A issues a request to reserve a second lock 1440 with a shared attribute again (step 1502). Since the second lock 1440 is also not reserved by any process at this point, it is immediately reserved by the process A with a shared attribute (step 1503). Next, the process A frees the first lock 1430 (step 1504). After this, the process A gains shared access to the shared resource 1420 and performs required processing (step 1505).

Suppose that exclusive access to the shared resource 1420 has become necessary in the process B while the process A is executing the step 1505. Accordingly, the process B issues a request to exclusively reserve the corresponding first lock 1430 (step 1507). Since the first lock 1430 is not reserved by any process at this point, it is exclusively reserved by the process B (step 1508).

Next, the process B issues a request to exclusively reserve the second lock 1440 (step 1509). However, since the process A is executing the step 1505, the second lock 1440 is reserved with a shared attribute by the process A and the exclusive reservation request from the process B is not accepted. The process B continues in second lock wait spin until the second lock 1440 is freed (step 1510).

At this time (when the process B is executing the step 1510), suppose that shared access to the shared resource 1420 has become necessary in the process C. Accordingly, the process C issues a request to reserve the corresponding first lock 1430 with a shared attribute (step 1515). However, since the process B is executing the step 1510, the first lock 1430 is exclusively reserved by the process B and the shared reservation request from the process C is not accepted. The process C continues in first lock wait spin until the first lock 1430 is freed (step 1516).

Suppose the step 1505 terminates in the process A and the second lock 1440 is freed (step 1506, time t21 in FIG. 15). The process B, which has been spinning to wait for the second lock 1440 to be freed, can exclusively reserve it (step 1511). This is because only the process B is waiting at this point for the second lock 1440 to be freed.

Thus, when the processes A, B, and C request one shared resource with shared, exclusive, and shared attributes in that order, according to the present invention, the preceding exclusive request from the process B will not be aborted due to preference for the following shared request from the process C.

Subsequently, the process B frees the first lock 1430 (step 1512, time t22 in FIG. 15). At this point, the process C can reserve the first lock 1430 with a shared attribute (step 1517). Then, the process C issues a request to reserve the second lock 1440 with a shared attribute (step 1520), but the second lock 1440 is already exclusively reserved by the process B and a shared reservation request from the process C is not accepted. The process C continues in second lock wait spin until the first lock 1440 is freed (step 1519). The process B exclusively accesses the shared resource 1420 from immediately after the step 1512 and performs required processing (step 1513).

Suppose the step 1513 terminates in the process B and the second lock 1440 is freed (step 1514, time t23 in FIG. 15). The process C, which has been in second lock wait spin to wait for the second lock 1440 to be freed, can reserve it with a shared attribute (step 1520). The process C frees the first lock 1430 (step 1521) and performs processing using the shared attribute 1420.

Although there are three processes shown that access shared resources for convenience of explanation, the method according to the present invention does not limit the number of processes to just three. With the same processing procedure regardless of the number of processes, the aborting of exclusive requests due to a preference for shared requests issued later can be avoided.

In the method for managing shared resources among computers in a parallel computer system using a coupling facility, when resource reservation fails, a relevant computer is registered in a resource queue, and the coupling facility actively reports as required that other resources are freed, using the resource queue, whereby both the computers and the coupling facility are relieved from the load on shared resource management to improve performance of the entire system.

In exclusive control of shared resources by use of a spin lock having shared and exclusive attributes, by using two locks for one shared resource, the aborting of exclusive requests can be avoided to achieve fair resource management.

According to the invention, an enqueue structure type is newly provided within a coupling facility to record the use state and the request queue of resources shared among programs. All programs to use a shared resource issue a request to reserve the shared resource to the coupling facility before using it. The coupling facility affords the permission to use the resource to the programs if it is usable, and adds the programs to the resource request queue if unusable. When a program using the shared resource frees it, the coupling facility fetches a program from the beginning of the request queue and notifies the program that the use of the shared resource has been approved. On receiving the notification, the program uses the shared resource without asking the coupling facility for the approval of the use of the shared resource again.

While preferred embodiments have been set forth with specific details, further embodiments, modifications and variations are contemplated according to the broader aspects of the present invention, all as determined by the spirit and scope of the following claims.

We claim:

1. A method for managing shared resources in a parallel computer system in which a plurality of computers having programs are connected to a coupling facility, comprising the steps of:

storing a use state data object in said coupling facility indicating whether a resource shared among said computers is being used or not, and storing a use queue;

issuing a reservation request to one of said shared resources by one of said programs on said computers before using said one shared resource and reserving said shared resource for said one program with said coupling facility if said shared resource is unused;

adding said one program to the use queue for said one shared resource if said shared resource is being used by another of said programs;

reserving the right to use said shared resource for a next one of said programs in the use queue for said shared resource when said another program using said one shared resource frees said one shared resource; and notifying said next program that said one shared resource is reserved for said next program.

2. A method for managing shared resources according to claim 1, further including storing a data object in said use queue for registering in chronological order said programs that issue reservation requests for the shared resources.

3. A method for managing shared resources according to claim 1, further including registering a user identifier of a program in the coupling facility when said program reserves the right to use one of said shared resources.

4. A method for managing shared resources according to claim 1, further including creating the use state data object and the use queue in memory in said coupling facility.

5. A method for managing shared resources according to claim 1, further including deleting the use state data object and the use queue in said coupling facility.

6. A system for managing shared resources in a parallel computer system in which a plurality of computers having programs are connected to a coupling facility, comprising:

said coupling facility having a use state data object indicating whether a resource shared among said computers is being used or not, and a use queue, wherein, when one of said programs on said computers issues a reservation request to one of said shared resources before using the shared resource, said coupling facility, if said shared resource is unused, reserves said shared resource for said program, and if said shared resource is being used by another of said programs, adds said one program to the end of the use queue for said shared resource, and wherein, when said another program using said shared resource frees said shared resource, the coupling facility reserves the right to use said shared resource for a next one of said programs in the use queue for said one shared resource and notifies said next program that said one shared resource is reserved for said next program.

7. A system for managing shared resources according to claim 6, wherein the coupling facility stores a data object for registering in chronological order said programs requesting use of the shared resources to form said use queue.

8. A system for managing shared resources according to claim 6, wherein said coupling facility reserves the right to use said shared resource by said program in response to receiving a shared resource reservation command.

9. A system for managing shared resources according to claim 8, wherein before a program uses a shared resource, and wherein, on receiving the shared resource reservation command, the coupling facility registers the program using a shared resource as the user of said shared resource.

10. A system for managing shared resources according to claim 8, wherein the coupling facility is provided with a command for creating and a command for deleting an object containing a use state indicating whether a shared resource is being used or not, and a use queue.

11. A system for managing shared resources according to claim 6, wherein when a shared resource reserved by said programs is freed, the coupling facility receives a shared resource free command, and wherein, on receiving said command, the coupling facility returns the state of said shared resource to a free state.

12. A coupling facility for managing shared resources in a parallel computer system including a plurality of computers connected together through channels, the computers having programs, comprising:

an instruction processor and memory, wherein said memory stores a data structure including a shared resource queue for each resource, wherein, when one of the programs requests a shared resource, if said shared resource is unused, said shared resource is reserved for said program, and if said shared resource is being used by another of said programs, said one program is added to an end of the use queue for said shared resource, and wherein, when said another program using said shared resource frees said shared resource, the coupling facility transfers the right to use the shared resource to a next one of the programs in the use queue for said shared resource and notifies the next program that the shared resource is free.

13. A coupling facility for managing shared resources according to claim 12, wherein said data structure is an eneque (ENQ) structure that includes a user management table and an ENQ set, wherein said ENQ set includes said use queue for each of said shared resources and further wherein said use queue includes enqueue entries (ENQEs) specific to each of said programs waiting for use of said shared resource.

14. A coupling facility for managing shared resources according to claim 12, wherein the user management table includes a resource notification token that is an identifier specific to an ENQ structure and a computer identifier that is an identifier uniquely specifying the computers.

15. A coupling facility for managing shared resources according to claim 12, wherein the ENQ set includes a resource status object that points to one of said programs which uses the resource is used and an ENQ list that points to said use queue which identifies programs that are waiting for the resource to be freed.

16. A parallel computer system having computers connected to a coupling facility via intersystem channels each including instruction processing units, memory, input-output processors, and channels, wherein:

said coupling facility receives a message command block (MCB) sent via the intersystem channels from the computers and executes a predetermined command according to operands specified in the MCB, including a command creating a message response block MRB that is sent back to the computer that sent the MCB, and wherein the coupling facility executes a command to report acceptance of a reservation request for a shared resource requested by a program to a specific computer by sending the MRB via the intersystem channel and further wherein a data structure is created when a program that requests reservation of a shared resource that is being used by another of said programs to put the reservation request in a use queue chronologically, so that the shared resource is reserved for a next program in said use queue when said another program frees said shared resource.

17. A system for managing shared resources according to claim 16, wherein said command is an enqueue notification from which the specified computer can determine the acceptance of a reservation request for a suspended resource.

18. A system for managing shared resources according to claim 16, wherein the coupling facility has substantially the same hardware configuration as that of the computers.

19. A method for managing shared resources by use of spin locks used in resource exclusion processing in a computer system in which a plurality of processors operate in parallel, comprising the steps of:

reserving exclusive and shared use of said shared resources with first and second locks corresponding to said shared resources;

reserving said first lock of one said resource for exclusive use by a first one of said programs of said one resource and reserving said second lock of said one resource if none of said programs is using said one resource and lock wait spinning for said second lock if another of said programs is using said one resource until said another program subsequently frees said second lock for said one resource, and freeing said first lock for said one resource when said second lock for said one resource is successfully reserved by said first program; and reserving said first lock of one said resource for shared use of said one resource by a second one of said programs and reserving said second lock of said one resource if none of said programs is using said one resource or if any of said programs is just in shared use of said one resource followed by freeing said first lock for said one resource when said second lock for said one resource has been reserved by said second program.

20. A system for managing shared resources by use of spin locks used in resource exclusion processing in a computer environment in which a plurality of processes operate in parallel, comprising:

first and second locks provided for one shared resource for resource management;

means for exclusively reserving a resource that exclusively reserves a first lock corresponding to said resource and exclusively reserves a second lock corresponding to said resource, and frees said first lock;

means for reserving said resource with a shared attribute that reserves the first lock corresponding to said resource with a shared attribute, reserves the second lock corresponding to said resource with a shared attribute, and frees the first lock; and means, after reserving the second lock, for respectively reserving exclusive or shared access to said resource, and if access to said resource becomes unnecessary, frees the second lock regardless of the exclusive or shared access.

* * * * *